Oct. 21, 1958   A. G. ANDERSON   2,857,062
APPARATUS FOR LOADING AND UNLOADING BRICKS AND THE LIKE
Filed Sept. 8, 1954   8 Sheets-Sheet 1

ALLAN G. ANDERSON,
INVENTOR.

BY Eaton & Bell

ATTORNEYS

ALLAN G. ANDERSON,
INVENTOR.

BY Eaton + Bell

ATTORNEYS.

ALLAN G. ANDERSON,
INVENTOR.

BY Eaton + Bell

ATTORNEYS.

Oct. 21, 1958 A. G. ANDERSON 2,857,062
APPARATUS FOR LOADING AND UNLOADING BRICKS AND THE LIKE
Filed Sept. 8, 1954 8 Sheets-Sheet 8

ALLAN G. ANDERSON,
INVENTOR.

BY Eaton + Bell

ATTORNEYS.

United States Patent Office 2,857,062
Patented Oct. 21, 1958

2,857,062

APPARATUS FOR LOADING AND UNLOADING BRICKS AND THE LIKE

Allan G. Anderson, Cheraw, S. C.

Application September 8, 1954, Serial No. 454,761

2 Claims. (Cl. 214—75)

This invention relates to apparatus for loading and unloading stacked or bulky materials, such as hacks of bricks and the like and, more especially, to means adapted to be mounted on a truck, truck-trailer or other mobile vehicle or conveyance, for lifting stacks of brick or other materials and depositing the same in any desired position transversely of or longitudinally of the conveyance.

It is an object of this invention to provide a novel crane of the pivoted boom type provided with a fluid pressure operated cylinder for raising and lowering the boom and wherein a carriage is provided which is movable longitudinally of the vehicle bed and which main carriage has an auxiliary carriage mounted for lateral movement thereon, on which laterally movable auxiliary carriage the crane is swivelly mounted for movement about a vertical axis.

It is another object of this invention to provide an apparatus of the character last described wherein novel selectively controlled means are provided for selectively moving the main carriage longitudinally of the mobile vehicle bed or for moving the auxiliary carriage laterally of the main carriage or for rotating the boom about its vertical axis or for raising and lowering said boom.

It is still another object of this invention to provide a novel form of grab or grappling device connected to the boom cable, which grab or grappling device comprises a pair of tongs or grappling arms which are automatically operable to tightly engage opposite sides of the bottom layer of a stack of brick or similar material upon alternate upward movements of the grappling device and which will, upon the intervening upward movements thereof, automatically release the bottom layer of the stack of brick or similar material.

Some of the objects of the invention having been stated, other objects will appear as the description proceeds when taken in connection with the accompanying drawings, in which—

Figure 8-A is an enlarged fragmentary plan view taken substantially along line 8-A—8-A in Figure 8;

Referring generally to the drawings, the invention comprises a crane assembly broadly designated at 10 which is mounted for rotation or oscillation about a vertical axis on a secondary or auxiliary carriage 11. The auxiliary carriage 11 is mounted for lateral movement on a main or primary carriage broadly designated at 12, which primary carriage is mounted for longitudinal movement lengthwise of an especially constructed conveyance in the form of a truck bed or trailer bed broadly designated at 13. The cable of the crane assembly 10, designated at 14, has a novel form of brick grab or grappling device broadly designated at 15 connected thereto. In this instance, the mobile vehicle bed 13 is shown in the form of an elongated trailer which is supported on wheels 16 adjacent its rear end and whose front end is connected, by means of a fifth wheel assembly 17 to the rear end of an automotive tractor broadly designated at 20, which tractor is supported on front and rear wheels 21, 22. The tractor 20 is equipped with the usual fluid pressure pump indicated schematically at P in Figure 13 and a fluid reservoir indicated at 23 in Figures 1 and 13.

Now, the novelty of the invention not only resides in the crane assembly 10, the carriages 11 and 12 and the improvements made in the bed 13, but the novelty of the invention also resides in remotely controlled means for raising and lowering the boom of the crane assembly 10, for imparting lateral or transverse movement to the auxiliary carriage 11, and for imparting longitudinal or forward and rearward movement to the main carriage 12. The novelty of the invention also is embodied in means for automatically effecting inward movement to the tines, tongs or gripper levers of the article grappling device 15 following alternate downward movements thereof so that, with each upward movement of the grappling device subsequent to said alternate downward movements thereof, the jaws of the grappling device 15 will tightly clamp the stack of articles or bricks therebetween and will thereby raise said articles or bricks as a unit. On the other hand, in the course of each downward movement between said alternate downward movements of said grappling device, upon the weight of the articles or bricks being supported by either the truck bed or the ground adjacent the truck bed, the tines or tongs of the grappling device are automatically moved apart from each other to release the articles therefrom as they subsequently move upwardly. The means for moving the arms apart from each other also serves to prevent said arms from again moving inwardly until the next succeeding downward movement of the grappling device or, at least, until the weight of the tongs, gripper levers or tines on the cable of the boom assembly is relieved.

Mobile bed construction

Referring more specifically to the drawings, the mobile bed, trailer bed, truck bed or conveyance 13 is generally of conventional construction to the extent that the chassis thereof includes conventional longitudinally extending side chassis frame members 30, 31 (Figures 1, 2 and 5) to which opposite ends of a plurality of longitudinally spaced transversely disposed frame members 32 are suitably secured. The rearmost ends of the chassis side frame members 30, 31 preferably have opposite ends of the lower portion of a tail plate 33 (Figure 1) suitably secured thereto which projects upwardly therefrom to prevent tiers or stacks of articles or bricks A from sliding off the rear end of the platform of the vehicle bed 13 during forward movement of the tractor 20 and the vehicle bed or truck bed 13.

Figure 1:
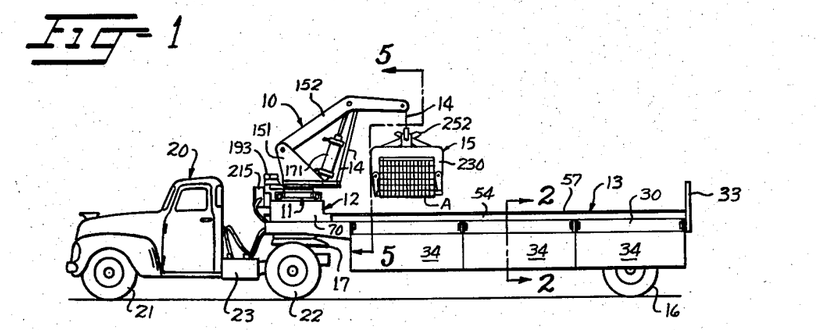
Figure 1 is a side elevation of a mobile vehicle or conveyance shown in the form of a truck-trailer combination, showing the improved loading and unloading mechanism mounted on a novel type trailer bed.
Figure 3:
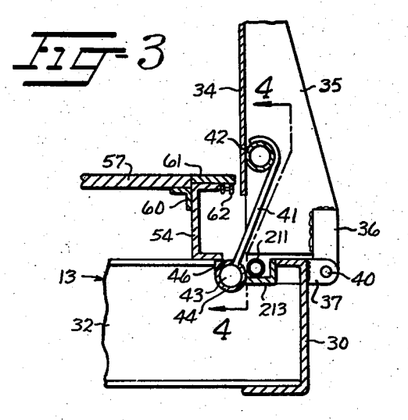
Figure 3 is a fragmentary view similar to Figure 2, but showing the corresponding hinged side panel of the truck bed or conveyance in operative or raised position.
Figure 4:
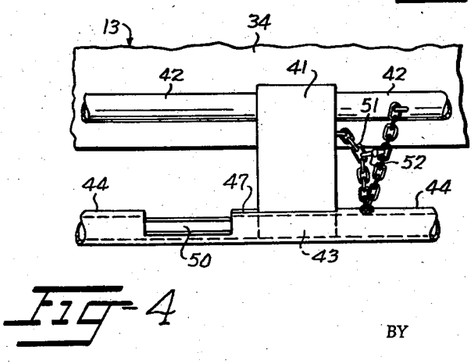
Figure 4 is a fragmentary vertical sectional view taken substantially along line 4—4 in Figure 3 and showing, in particular, the means for locking the side panels or gates of the truck bed in raised or operative position.

Each side of the truck bed 13 is provided with a plurality of pivoted side panels or side gates, each of which is indicated at 34, there being three such side panels or gates 34 shown on the side of the vehicle bed 13 illustrated in Figure 1. The front and rear edge of each of the side panels or side gates 34 each has a reinforcing plate 35 thereon which projects outwardly from the corresponding side panels or gates 34 when the side panels or gates 34 are in raised or operative position as shown in Figures 3 and 4. Each of the reinforcing plates 35 is pivotally supported on the corresponding chassis side frame member such as by means of blocks 36, 37 suitably secured to the plates 35 and the corresponding chassis side frame members 30, 31, which blocks 36, 37 are pivotally interconnected, as at 40.

In order to securely latch each of the side gates 34 in raised position, a relatively broad, flat hook-shaped latch plate 41 is provided for each side panel or side gate 34, whose curved or hooked upper end is adapted to fit partially around a bracing shaft or bar 42 whose opposite ends are suitably secured to the corresponding end plates 35. The shaft 42 is disposed in close proximity to, or against, the normally outward surface of the corresponding side panel or plate 34. The lower edge of each latch plate 41 is fixed to a bar 43 which is preferably circular in cross-section and which loosely fits in a pipe or guide member 44. The tubular guide member 44, at each side of the truck bed 13, is suitably secured to the corresponding outer end portions of the transverse frame members 32. It will be observed in Figures 2 and 3 that opposite ends of each of the transverse frame members 32 are provided with a groove or notch 46 in which the corresponding pipe or tubular guide member 44 fits so the upper surface of each guide member 44 is substantially flush with the mean upper surface of each transverse frame member 32. The tubular guide members 44 are suitably secured in the notches 46 formed in opposite ends of the transverse frame members 32, as by welding.

It will also be observed in Figures 3 and 4 that each of the longitudinally extending tubular guide members 44 is provided with a relatively short and narrow slot 47 which is preferably disposed substantially mid-way of the length of each of the corresponding side gates 34 and through which the corresponding latch plate 41 extends in sliding engagement and at an angle, to thereby maintain the latch plate 41 in the desired position necessary to maintain the side plates or side panels 34 in substantially vertical position when they are in operative or closed position as shown in Figure 3. In order to release the side panels or side gates 34 from the corresponding latch plates 41, it will be observed in Figure 4 that there is provided, for each of the latch plates 41, an opening 50 formed in the tubular guide member 44 which is of a width substantially the same as that of the latch plate 41 and which permits removal of the latch plate and its guide rod 43 from the tubular guide member 44 when desired. In order to maintain each of the latch members 41 in the corresponding slot 47, it will be observed in Figure 4 that each of the latch plates 41 has one end of a link chain 51 connected thereto whose other end is connected to the corresponding shaft or rod 42.

When extended, the chain 51 is of sufficient length to permit removal of the corresponding latch plate 41 from the guide rod or tubular guide member 44, however, when each of the latch plates 41 has been properly inserted through the corresponding slot 47, the adjacent links of the chain 51 are suitably attached by means of a suitable clasp member indicated at 52 which will thereby limit movement of the corresponding latch plate 41 toward the corresponding opening 50. It is apparent, that, when the clasp 52 is removed from the chain 51 and the latch plate 41 is removed from the tubular guide member 44, the chain 51 then supports the corresponding latch plate 41 so it is within ready reach of the operator when the operator again desires to raise and lock the corresponding side gates or side panels 34 from the position shown in Figure 2 to the position shown in Figure 3.

Spaced inwardly of the longitudinally extending chassis side frame members 30, 31 and suitably secured to the upper surfaces of the transverse frame members 32 is a pair of channel-shaped side frame members or tracks 54, 55 which are preferably of substantially the same length as the chassis side frame members 30, 31 and whose upper and lower flanges face outwardly for guiding the rollers of the main carriage 12, as will be later described (Figures 2, 5, 7, 8, 10, 11 and 12). Spaced inwardly of the side frame members or tracks 54, 55 are spaced intermediate longitudinally extending frame members 56 (Figure 5) which support the central portion of an elongated platform or deck 57 whose opposite edge portions are supported on frame members 60, which are shown in the form of relatively small angle bars suitably secured to the proximal or inner surfaces of the tracks 54, 55.

A longitudinally extending, relatively narrow chain supporting plate 61 is suitably secured, as by welding, to the upper surface of the upper flange of each of the side tracks 54, 55 and it will be observed in Figures 2, 3, 5 and 12 that the upper surfaces of the track guiding plates 61 are substantially flush with the upper surface of the platform or deck 57. The track guiding plates 61 also extend outwardly substantially beyond the outer edges of the upper flanges of the side tracks 54, 55 and the exposed lower surfaces thereof are engaged by respective track sprocket chains 62, 63 (Figures 5, 10, 11 and 12) which are disposed immediately outwardly of the upper flanges of the respective side tracks 54, 55 and whose opposite ends are suitably secured to the opposite endmost portions of the respective tracks 54, 55 and to the lower surfaces of the corresponding track guiding plates 61. The purpose of the track sprocket chains 62, 63 will be later described.

Main and auxiliary carriage

The main or lower carriage 12 comprises front and rear transverse channel bars or auxiliary carriage tracks 65, 66 which extend transversely relative to the longitudinal axis of the truck bed or conveyance 13 and whose opposite end portions are suitably secured, by welding, to the upper surfaces of corresponding pairs of outer and inner main carriage side plates or side wall members 70, 71 and 70', 71' (Figures 5, 7, 8, 10, 11 and 12). The inner side plates 71, 71' extend downwardly closely adjacent the outer edges of the corresponding track chain guiding plates 61 and their lower edges terminate immediately above the level of the transverse chassis frame members 32.

The outer side plates 70, 70' are preferably of substantially the same size and shape as the inner side plates 71, 71' and are held in spaced relation to the inner side plates 71, 71' by a plurality of spacing bars respectively designated at 72, 72'. Reduced opposite ends of the spacing bars 72 are threaded and penetrate the inner and outer side plates 70, 71 and the plates are secured thereto, as by nuts 73. The reduced opposite ends of the spacing bars 72' are also provided with nuts 73' for securing the plates 70', 71' in spaced relation to each other.

Figure 5:
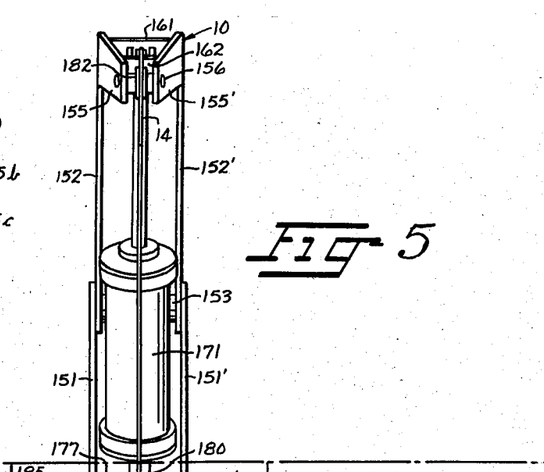
Figure 5 is an enlarged elevation of the fluid pressure operated crane assembly and its carriage, showing portions of the trailer or truck bed in section and being taken looking substantially along line 5—5 in Figure 1.
Figure 6:
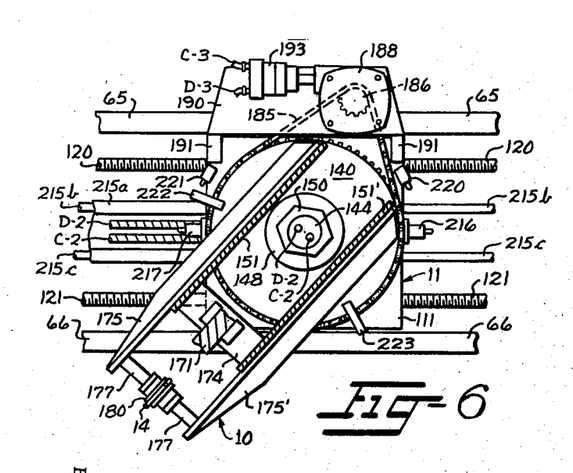
Figure 6 is a fragmentary sectional plan view taken substantially along line 6—6 in Figure 5, but showing the crane in a different position relative to the carriage therefor from that shown in Figure 5.
Figure 10:
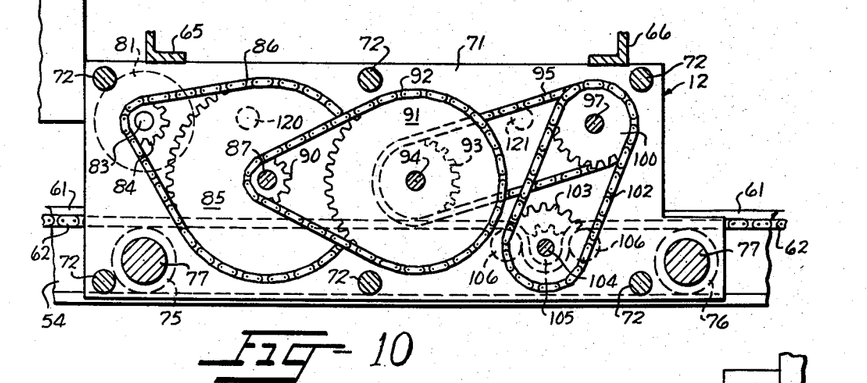
Figure 10 is an enlarged fragmentary elevation, partially in section, taken substantially along line 10—10 in Figure 5, showing the means for imparting movement to the primary or main carriage longitudinally of the trailer bed.
Figures 11, 12:
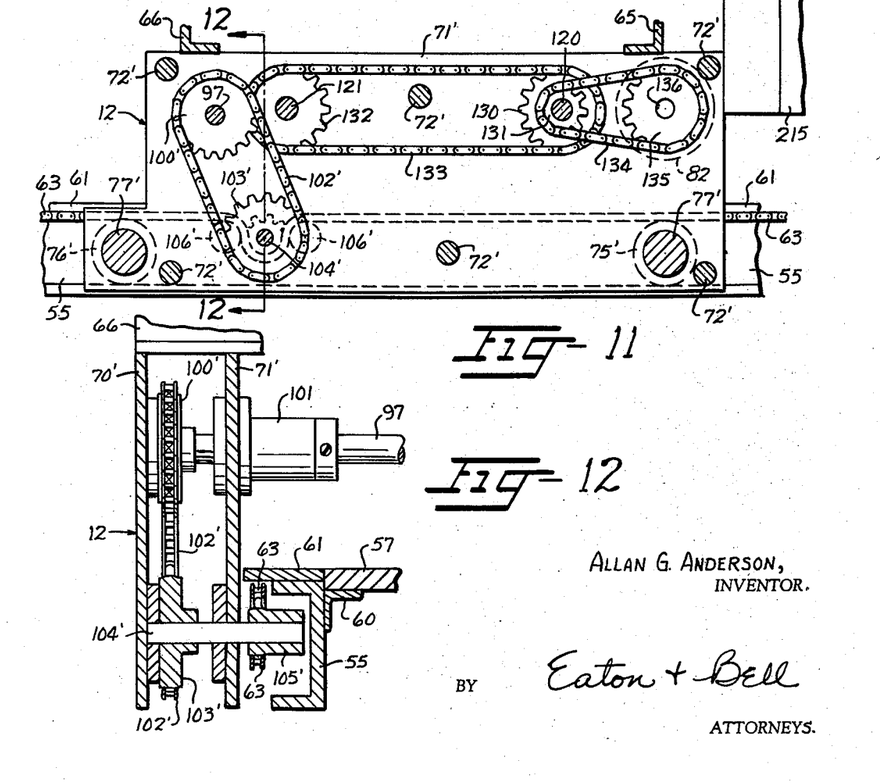
Figure 11 is an enlarged fragmentary elevation, partially in section, taken substantially along line 11—11 in Figure 5 and showing portions of the means for imparting longitudinal movement to the main carriage and portions of the means for imparting lateral movement to the auxiliary carriage.
Figure 12 is an enlarged fragmentary vertical sectional view taken substantially along line 12—12 in Figure 11.

It will be observed in Figures 5, 10 and 11 that the main carriage side frame members or side plates 70, 71 and 70', 71' support respective pairs of forwardly and rearwardly spaced rollers or wheels 75, 76 and 75', 76' which fit between the upper and lower flanges of the respective main carriage tracks or side tracks 54, 55. The rollers 75, 76, 75', 76' are journaled on the reduced inner ends of respective shafts or bars 77. It will be noted that the enlarged portions of the shafts 77 serves as spacers between the side plates 70, 71 and the enlarged portions of the shafts 77' serve as spacers between the side plates 70', 71'. The outer side plates 70, 70' are suitably secured on the reduced outer ends of the corresponding shafts or bars 77, 77' as by nuts 80, 80'.

Suitably secured to the inner surfaces of the respective side plates 71, 71', adjacent their upper foremost corners, are reversible motors 81, 82, respectively, which are preferably fluid pressure type motors, as shown in Figures 7, 10, 11 and 13. The motor 81 serves to impart movement to the main carriage 12, and the parts carried thereby, longitudinally of the trailer bed 13. The motor 82 serves to impart lateral or transverse movement to the secondary or auxiliary carriage 11. The fluid pressure circuits for the motors 81, 82 will be later described.

Figure 7:
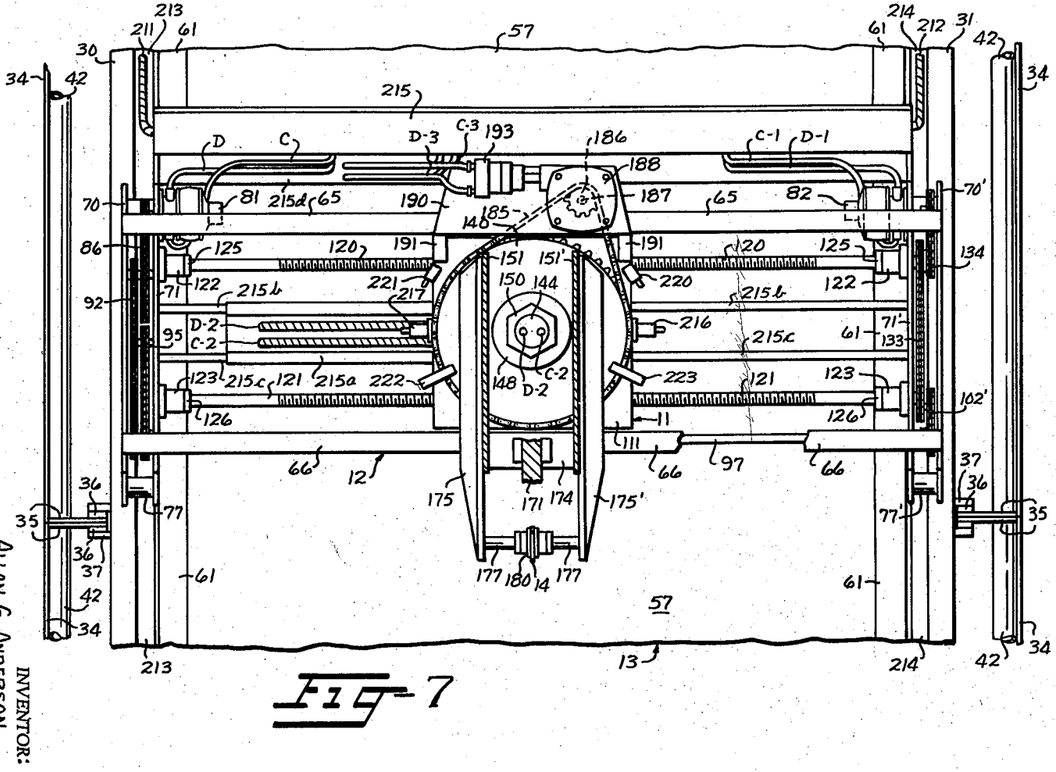
Figure 7 is a fragmentary plan view, partially in section, taken substantially along line 7—7 in Figure 5.

Referring to Figures 7 and 10, it will be observed that the motor 81 has a shaft 83 thereon which loosely penetrates the inner right-hand side plate 71 on the main carriage 12 and has a relatively small sprocket wheel 84 fixed thereon which drives a relatively large sprocket wheel 85 by means of an endless sprocket chain 86. Sprocket wheel 85 is fixed on a stub shaft 87 journaled in the plates 70, 71 and on which a relatively small sprocket wheel 90 is also fixedly mounted. Sprocket wheel 90, in turn, transmits rotation to a sprocket wheel 91, by means of an endless sprocket chain 92.

The sprocket wheel 91 and a sprocket wheel 93 are fixed on a common stub shaft 94 also journaled in the righthand side plates 70, 71 of the main carriage 12. The sprocket wheel 93 is relatively smaller than sprocket wheel 91 and is engaged by an endless sprocket chain 95 which also engages a sprocket wheel 96 (Figure 5). The sprocket wheel 96 is fixed on a transverse shaft 97 which extends across and above the deck or platform 57 and has sprocket wheels 100 and 100' fixed on opposite ends thereof (Figures 10, 11 and 12). The shaft 97 is journaled in bearing blocks 101 carried by the inner side plates 71, 71'.

Referring to Figures 10, 11 and 12, it will be observed that the sprocket wheels 100, 100' are engaged by respective endless sprocket chains 102, 102' which extend downwardly and also engage respective sprocket wheels 103, 103' journaled on respective stub shafts 104, 104'. The stub shafts 104, 104' are suitably journaled between the corresponding sets of side plates 70, 71 and 70', 71'. The stub shafts 104, 104' also loosely penetrate the inner side plates 71, 71' of the main carriage 12 and have respective sprocket wheels 105, 105' fixed thereon, as best shown in Figures 10, 11 and 12.

The elongated or extended track sprocket chains 62, 63 heretofore described, extend beneath and in engagement with the respective sprocket wheels 105, 105' and the sprocket chains 62, 63 are maintained in engagement with the respective sprocket wheels 105, 105' by corresponding pairs of rollers 106, 106' which are suitably rotatably mounted adjacent the inner surfaces of the respective inner side plates 71, 71' of the main carriage 12.

It is thus seen that, upon rotation of the shaft 83 of motor 81 in either direction, corresponding rotative movement, at a reduced speed, is imparted to the sprocket wheels 105, 105' then move in engagement with the respective track chains 62, 63 to impart longitudinal movement to the main carriage 12 and the parts carried thereby, since the rollers 75, 76 and 75', 76' then ride in the respective side tracks 54, 55.

The secondary or auxiliary carriage will now be described in detail. The secondary of auxiliary carriage 11 comprises a built-up substantially rectangular frame 110 (Figures 5, 8 and 9), to the upper surface of which a bearing plate 111 is suitably secured. Forwardly and rearwardly extending axles or shafts 112 and 113 (Figure 9) are journaled in the front and rear portions of the rectangular frame 110 and the front ends of the shafts 112, 113 each has a roller or wheel 114 fixed thereon and the rollers 114 ride in the transverse auxiliary carriage track or channel bar 65. The rear ends of the shafts 112, 113 each has a roller 115 thereon and the rollers 115 ride in the rear transverse auxiliary carriage track or channel bar 66 (Figures 5, 8 and 9).

Figures 8, 9:
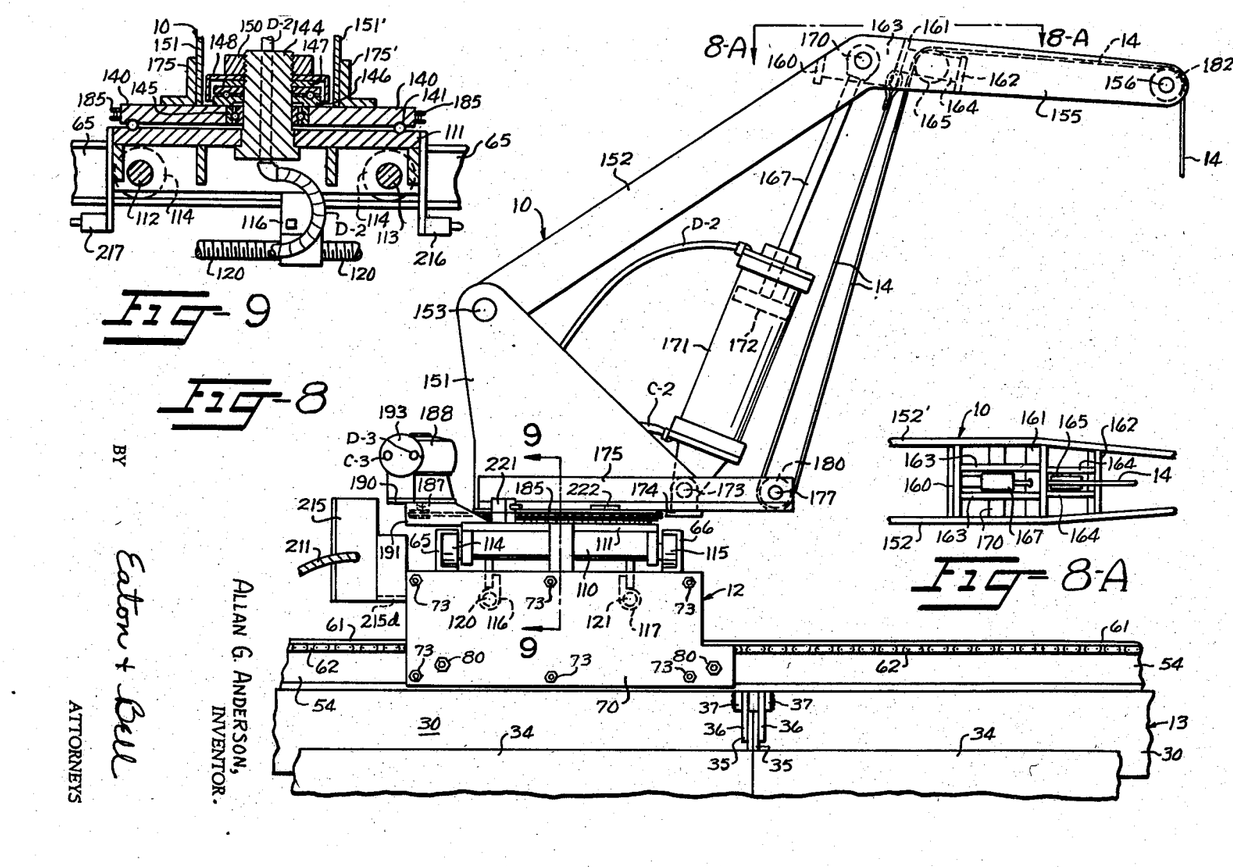
Figure 8 is an enlarged elevation similar to the upper central portion of Figure 1, showing the crane assembly and carriages therefor, but omitting the grappling device and also being taken looking at the left-hand side of Figure 5.
Figure 9 is an enlarged fragmentary vertical sectional view taken substantially along line 9—9 in Figure 8 and showing the manner in which the crane assembly is rotatably supported by the laterally movable carriage.

Depending from the rectangular frame 110 is a pair of forwardly and rearwardly spaced internally threaded members or nuts 116, 117 (Figures 5, 8 and 9). The nuts 116, 117 are threadably penetrated by respective front and rear transverse externally threaded shafts or screws 120, 121 whose opposite end portions are journaled in respective pairs of bearing blocks 122, 123 (Figure 7) suitably secured to the proximal surfaces of the inner side plates 71, 71' of the main carriage 12. Movement of the threaded shafts 120, 121, longitudinally of their respective axes is limited by suitable thrust washers bearings or collars 125, 126 fixed on the respective shafts 120, 121 and slidably and rotatably engage the proximal surfaces of the respective bearing blocks 122, 123.

It will be observed in Figures 7 and 11 that corresponding ends of the threaded shafts 120, 121 loosely penetrate the side plate 71' and the front threaded shaft 120 has a pair of sprocket wheels 130, 131 fixed thereon. The corresponding end of the rear threaded shaft 121 has a sprocket wheel 132 fixed thereon. The sprocket wheels 130, 132 are engaged by a common endless sprocket chain 133 and the sprocket wheel 131 is engaged by an endless sprocket chain 134 which also engages a sprocket wheel 135 fixed on a motor shaft 136 driven by the reversible motor 82 heretofore described. Means, to be later described, are provided for manually controlling the intervals of and the direction of rotation of the motor shaft 136 and it is apparent that, with rotation of the motor shaft 136 in either direction, corresponding rotative movement is imparted to the two threaded shafts 120, 121 to thereby impart lateral movement in the corresponding direction to the secondary or auxiliary carriage 11.

Crane or boom assembly

As heretofore stated, the crane or boom assembly 10 is mounted for rotative movement about a vertical axis on the secondary or auxiliary carriage 11. The crane 10 comprises a circular base 140 which is mounted for rotation on the substantially rectangular platform or plate 11 of the secondary or auxiliary carriage 11, preferably by means of a circular row or series of balls 141 which ride in suitable complementary grooves provided in the proximal surfaces of the base plate 140 of the crane 10 and the plate 11 of the auxiliary carriage 11. The crane base 140 is maintained in position relative to the auxiliary carriage plate 11 by means of a substantially vertically disposed axle or shaft 144 (Figure 9) whose lower portion is fixed in the auxiliary carriage plate 111 and whose reduced upper or medial portion loosely penetrates the crane base plate 140, an antifriction or ball bearing 145 preferably being provided between the crane base plate 140 and the medial portion of the vertically disposed shaft 144.

The crane base plate 140 is held against the balls, 141 by means of a relatively large thrust bearing 146, a washer 147 and a peripherally flanged skirt or annular member 148, the upper end of which is engaged by a nut 150 threadably mounted on the upper end of the vertically disposed pivot shaft 144. Suitably secured to the upper surface of the circular crane base plate 140 is a pair of uprising substantially triangularly shaped wall members or boom-supporting plates 151, 151' whose upper ends support one end of a lever or boom of built-up construction. The boom comprises side members 152, 152' which are pivotally connected, as at 153, to the upper ends of side plates 151, 151'.

It will be observed in Figures 1 and 8 that the spaced side members 152, 152' of said boom or lever extend upwardly and rearwardly at an angle and have respective rearwardly projecting converging portions 155, 155' integral therewithin whose spaced free ends a shaft 156 is suitably secured. The lever arms 152, 152' are spanned at their juncture with the respective portions 155, 155' thereof by a plurality of spaced transverse reinforcing bars or frame members 160, 161 and 162 (Figures 8 and 8-A), whose opposite ends are suitably secured to the proximal surfaces of the lever arms 152, 152'. It will be observed in Figures 8 and 8-A that the transverse bars 160, 161 have the front and rear ends of a pair of spaced pivot plates 163 suitably secured thereto and the bars 161 and 162 also have a pair of spaced pivot plates 164 suitably connected thereto and spanning the distance therebetween.

A pulley 165 is suitably journaled between plates 164 and the upper end of a piston rod 167 is pivotally mounted between the plates 163, as at 170. The pivot shaft 170 is mounted in plates 163 and levers 152, 152'. The piston rod 167 slidably penetrates the head of a double-acting cylinder 171 and has a piston 172 fixed on its lower end and mounted for longitudinal movement in the cylinder 171. The closed lower end of cylinder 171 is pivotally connected, as at 173, to a transverse bar 174 spaced closely adjacent the circular crane base plate 140 and whose opposite ends are suitably secured to the lower surfaces of frame members 175, 175'.

It will be noted that the frame member 175, 175', which are shown in the form of angle bars, extend forwardly in Figures 7 and 8 and are suitably secured to opposite surfaces of the boom-supporting side plates 151, 151' and to the upper surface of the circular base plate 140. The free rear ends of the angle bars 175, 175' support opposite ends of a transverse shaft 177 on which a pulley 180 is rotatably mounted. One end of the cable 14 is connected to the plate 161 and extends downwardly therefrom and passes beneath and partially around the pulley 180, from whence it extends upwardly and over the pulley 165 and then rearwardly over a pulley 182 rotatably mounted on the shaft 156. The cable 14 then extends downwardly and is connected to the article clamping or grappling device 15, shown in Figures 15 through 21, in a manner to be later described or to any object to be lifted.

Now, in order to impart rotational movement to the crane assembly 10 in either direction about its vertical axis and relative to the auxiliary carriage 11, the crane base plate 140 is preferably in the form of a sprocket wheel which is engaged by an endless sprocket chain 185 (Figures 5, 6, 7, 8 and 9). The sprocket chain 185 also engages a relatively small sprocket wheel 186 disposed forwardly of the crane base plate 140. The sprocket wheel 186 is fixed on a shaft 187 of a gear reduction unit 188 (Figures 7 and 8) mounted on a motor support plate 190 fixed on brackets 191 extending rearwardly from the substantially rectangular plate 111 of the auxiliary carriage 11. The gear reduction unit 188 is driven by a reversible motor 193 suitably secured to the motor support plate 190. The motor 193 is also preferably of the fluid pressure type. The means for activating the reversible motor 193 and the double-acting cylinder 171 will be presently described.

Electrical and fluid pressure circuits

Figure 13:
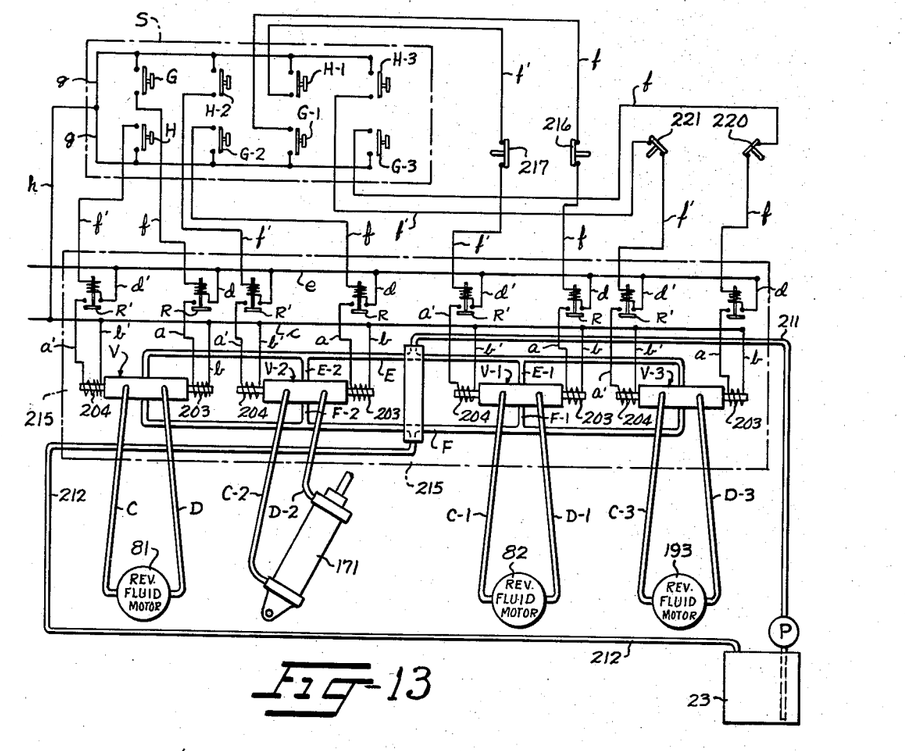
Figure 13 is a schematic diagram of the electrical and fluid pressure circuits of the improved loading and unloading apparatus.

Referring to Figure 13, there will be observed connected to opposite sides of the reversible motors 81, 82, the double-acting cylinder 171 and the reversible motor 193, respective pairs of pipes or conduits C and D, C-1 and D-1, C-2 and D-2, C-3 and D-3 and the other ends of said respective pairs of conduits are connected to spaced portions of respective electrically operable valve mechanisms V, V-1, V-2 and V-3. The valves V, V-1, V-2, V-3 may be of any desired construction and, by way of illustration, the valve V is shown in longitudinal section in Figure 14, since all of the valves V, V-1, V-2, V-3 may be identical, if desired.

In this instance, the housing of valve V has a longitudinally movable core 200 therein which is provided with reduced portions or armatures 201, 202 on opposite ends thereof and which armatures will also be termed as solenoid cores or plungers. The solenoid plungers 201, 202 are surrounded by respective solenoid coils 203, 204 which may be alternately energized by means to be later described. When neither of the coils 203, 204 is energized, the core 200 of the corresponding valve occupies a balanced position that is, the position shown in Figure 14.

In this instance, the core 200 of the valve V is urged to balanced position by a pair of compression springs 205, 206 which encircle the inner portions of the respective solenoid plungers 201, 202 and whose opposite ends engage the closed opposite ends of the housing 197 of the valve V and whose proximal ends engage the distal ends of the core 200. Fluid pressure inlet and outlet pipes or conduits E, F are communicatively connected to opposite sides of the valve V and also communicate with respective chambers or passageways 207, 208 formed in opposite sides of the valve core 200. It will be noted in Figure 14 that the passageways 207 and 208 are so formed that, when the valve core 200 occupies balanced or neutral position, fluid pressure cannot enter or leave either of the pipes or conduits C, D.

Figure 14:
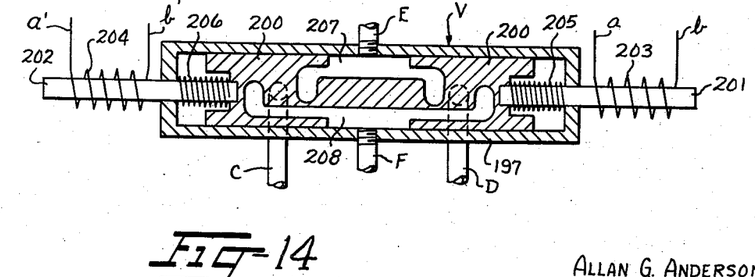
Figure 14 is an enlarged fragmentary longitudinal sectional view through one of the electrically operated valves shown in the central portion of Figure 13.
Figure 15:
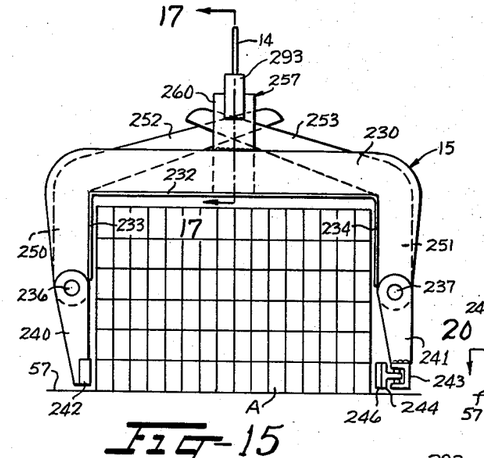
Figure 15 is an enlarged elevation of the grappling device shown in the central portion of Figure 1, but showing the grappling device removed from the raising and lowering means and also showing the grappling device preparatory to the jaws thereof as though they have just released the corresponding stack of bricks or similar articles therefrom.

However, upon movement of the valve core 200 from right to left in Figure 14, the left-hand portion of passageway 207 registers with conduit C and the right-hand portion of passageway 208 registers with conduit D, thus permitting fluid under pressure to enter the conduit C from the inlet conduit E and permitting fluid under pressure to return from the conduit D into the chamber or passageway 208 and out the outlet conduit F. On the other hand, upon movement of the valve core 200 from left to right in Figure 14, the passageway 207 then directs fluid under pressure from conduit E into conduit D while passageway 208 directs the returning fluid from conduit C through passageway 208 and into the return conduit F. Since all of the valves V-1, V-2, V-3 may be constructed and operated in the same manner as that described with respect to the valve V, a detailed description of the valves V-1, V-2, V-3 is deemed unnecessary.

Referring again to Figure 13, it will be observed that the ends of the pipes or conduits E, F remote from the valve V are connected to opposite sides of valve V-3 and the medial portions of the pipes or conduits E, F have respective pairs of branch pipes F-1, F-2 and E-1, E-2 leading therefrom to opposite sides of the respective valves V-1, V-2. The medial portions of the conduits E, F also have corresponding ends of respective pipes or conduits 211, 212 connected thereto whose other ends are connected to the fluid pressure pump P and the fluid reservoir 23, respectively.

Since it is well known that a fluid pressure pump has a suitable connection with the fluid reservoir, or is disposed within the fluid reservoir, it is apparent that the fluid pressure pump P will direct fluid under pressure into the pipes or conduits E, E-1, E-2 and, depending upon the position of the core 200 in each of the valves V, V-1, V-2, V-3, the fluid under pressure will be returned from said valves through the conduits F, F-1, F-2 and the conduit 212 to the reservoir 23. The valves V to V-3, inclusive, are suitably supported in an elongated transverse housing 215 (Figure 1, 5, 7, 8, 11 and 13) carried by the main longitudinally movable carriage 12.

Associated with each of the valves V to V-3, inclusive, is a pair of solenoid relays or magnetic relays R and R' to one side of which respective wires or conductors a, a' are connected, the other ends of said wires or conductors a, a' being connected to corresponding ends of the respective cores 203, 204. Corresponding ends of wires or conductors b, b' are connected to the other ends of the respective coils 203, 204 and the other ends of all of the wires or conductors b, b' are connected to a common ground wire or conductor c. The sides of the relays R, R' opposite from the respective wires a, a' have corresponding ends of respective wires or conductors d, d' connected thereto to which corresponding ends of the coils of the corresponding relays R, R' are also connected.

The other ends of all the wires d, d' are connected to a common lead wire e. The lead wires c, e are adapted to be connected to a suitable source of electircal energy, not shown, such as the storage battery of the automotive vehicle or tractor 20. The relays R, R' are also preferably disposed within the housing 215.

Figure 2:
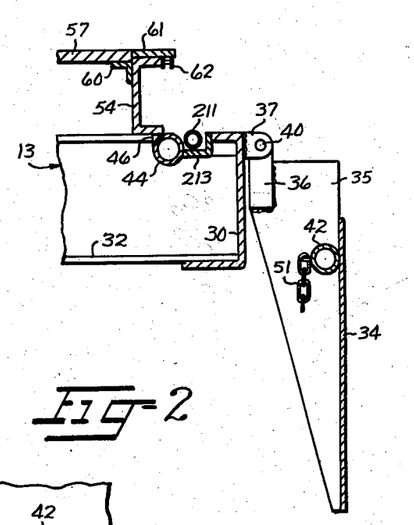
Figure 2 is an enlarged vertical sectional view taken substantially along line 2—2 in Figure 1 showing one of the hinged side panels in lowered position.

Since the main carriage 12 and the parts carried thereby can be moved throughout the length of the truck bed 12 in either direction, the conduits 211, 212 are preferably pliable or flexible and extend rearwardly from the fluid pressure pump P and the fluid reservoir 23, longitudinally through the central portion of the trailer bed 13 (Figure 5) to a point substantially midway between the front and rear ends of the trailer 13, where they branch out to the respective side frame members 30 and 31 and extend forwardly in respective troughs formed from angle bars 213, 214 suitably secured to the end portions of the transverse frame members 32 of the chassis. Opposite ends of each of the transverse chassis frame members 32 are cut away so the upper edges of the angle bars 213, 214 are substantially flush with the upper edges of the respective longitudinal chassis frame members 30, 31 as best shown in Figures 2, 3 and 5. From the troughs formed by the angle bars 213, 214 the flexible conduits or pipes 211, 212 lead into the housing 215 heretofore described.

Referring to Figures 5, 6, 7 and 9, it will be observed that the pipes or conduits C-2, D-2 (Figure 8) are connected to the respective lower and upper ends of the double-acting cylinder 171 and lead therefrom downwardly through the shaft 144 and their flexible portions then extend to the left in Figures 5 and 7 beneath the auxiliary carriage 11 and are supported in a U-shaped trough 215a, the upper edges of which are wrapped partially around supporting rods 215b and 215c (Figure 7). Opposite ends of the rods 215b, 215c are fixed in the plates 71, 71'. The conduits C-2, D-2 pass out of the trough 215a and forwardly beneath the front carriage track 65 and then into the housing 215 where they are connected to the valve V-2 as shown in Figure 13. Of course, since the housing 215 and the fluid pressure motors 81, 82, 193 move in unison with the main carriage 12, it is apparent, by referring to Figures 7 and 13, that the pipes or conduits C, D, C-1, D-1, C-3, D-3 extend from the corresponding motors 81, 82, 193 into the housing 215 where they are connected to the respective valves V, V-1, V-3. A shelf 215d (Figures 7 and 8) supports the coiled flexible medial portions of conduits C-3, D-3.

Now, in order to control energization of each of the coils 203, 204 associated with each of the valves V to V-3, inclusive, and to correspondingly control operation of the respective motors and the double-acting cylinder 171, a suitable portable switch unit or assembly S is provided, which switch unit S should be of a size which may be carried in the hands of the operator and is only shown schematically in Figure 13. It will be observed that the switch unit S includes a plurality of manually operable push-button two-point-make switches indicated at H, H-1, H-2, H-3, G, G-1, G-2 and G-3. The switches G to G-3, inclusive, are provided for controlling the flow of current to the solenoid coils 203 associated with the respective valves V to V-3, inclusive, and the switches H to H-3, inclusive, are provided for controlling the flow of current to the coils 204 associated with the respective valves V to V-3, inclusive.

To this end, the end of the coil associated with each of the relays R remote from that end to which the wire d is connected has one end of a wire or conductor f connected thereto and the other ends of the wires f are each connected to a corresponding one of the switches G to G-3, inclusive. The end of the coil associated with each of the relays R' remote from the corresponding wire d' has one end of a wire or conductor f' connected thereto. The other ends of the wires f' are connected to the corresponding switches H to H-3, inclusive. The sides of the switches G to G-3, inclusive, and H to H-3, inclusive, remote from those sides to which the respective wires f and f' are connected, are connected to a common wire or conductor g from whence a wire or conductor h leads to the ground wire c.

In order to prevent inadvertent movement of the secondary or auxiliary carriage 11 transversely above the main carriage 12, it will be observed that the wires f, f' leading from the respective switches G-1, H-1 have respective normally closed safety switches 216, 217 interposed therein. It will be observed in Figures 5 and 7 that the switches 216, 217 are suitably supported on opposite sides of the rectangular frame 110 of the auxiliary carriage 11 so they will engage the respective inner side frame members or side plates 71, 71' in the event that the auxiliary carriage 11 is permitted to move far enough toward the respective side frame members or inner side plates 71, 71' of the main carriage 12. It is apparent that when the plunger of switch 216 engages the side plate 71, this breaks the circuit to the solenoid coil 203 associated with valve V-1 to permit the core thereof to return to neutral position and to thereby stop the motor 82 although the switch H-1 remains closed. On the other hand, upon the plunger of switch 217 being permitted to engage the inner side plate 71' (Figure 5) this will break the circuit to the coil 204 associated with valve V-1 (Figure 13) to thereby permit the core thereof to return to neutral or balanced position and to then stop the motor 82 to thus prevent movement of the carriage 11 against the plate 71'.

The crane assembly 10 is also limited as to rotative movement about its vertical axis by means of a pair of safety stop switches 220, 221 interposed in the respective wires $f$, $f'$ leading from the respective switches D-3, H-3 in order to insure that the crane assembly 10 cannot be inadvertently rotated to where it will engage and damage the brackets 191 or the associated fluid pressure motor 193. Therefore, the switches 220, 221 are suitably secured to the rectangular platform 111 of the auxiliary carriage 11 and suitable switch engaging elements 222, 223 are carried by the crane base plate 140 for engaging the plungers of the respective switches 220, 221. The switches 220, 221 function in the same manner as the respective switches 216, 217 for controlling operation of the valve V-3 and a repetitive description thereof is deemed unnecessary.

Although the various wires $f$, $f'$ and $h$ leading from the portable switch unit S are shown as being spaced from each other in Figure 13, it is apparent that these wires are preferably disposed in a common flexible cable extending between the switch unit S and the housing 215 so the operator can walk beside the truck bed 13 along with the main carriage 12 as it is moved longitudinally of the truck bed 13 and remotely control the various movements of the crane 10.

It is apparent that, upon any one of the switches G to G-3, inclusive, and H to H-3, inclusive, being closed by the operator, the corresponding relay R or R', as the case may be, is energized or closed to thereby energize the corresponding coil 203 or 204, as the case may be. Thus, upon closing switch G, the reversible fluid pressure motor 81 will cause the main carriage 12 and the parts carried thereby to move in one direction and, upon closing the switch H, after permitting switch G to open, the reversible fluid pressure motor 81 will then cause the main carriage 12 to move in the other direction longitudinally of the truck bed 13. Of course, when both switches G and H are open, the core 209 of valve V occupied the position shown in Figure 14 to prevent fluid from flowing to either side of the reversible fluid pressure motor 81.

The boom levers 152, 152' are lowered and raised by alternately closing the respective switches G-2, H-2 to alternately cause fluid pressure to enter the upper and lower ends of the double-acting cylinder 171. The switches G-1 and H-1 also function in the same manner as switches G and H for controlling the direction of movement of the auxiliary carriage 11 transversely of the truck bed 13, as imparted thereto by the reversible fluid pressure motor 82. The switches G-3, H-3 control the direction of rotation of the shaft 187 of the reversible fluid pressure motor 193 for controlling the direction of rotation of the crane assembly 10 on the auxiliary carriage 11 in substantially the same manner as that described with respect to the manner in which the switches G and H control the direction of rotation of the reversible fluid pressure motor 81.

*Grab or grappling device*

The improved grappling device 15 is illustrated in Figures 1 and 15 to 21, inclusive, and, for purposes of description, it shall be assumed that the grappling device 15 has been lowered in Figures 15 to 18 from substantially the position shown in Figure 1 to where the stack of bricks or other articles A is resting upon the platform 57 of the truck bed 13 or is being supported upon any other surfaces such as the ground upon which the tractor-trailer combination is positioned.

The grappling device 15 comprises a pair of spaced, side-by-side substantially U-shaped inverted frame members 230, 231 to the lower surfaces of the horizontal portions of which an inverted U-shaped plate 232 is suitably secured and which has down turned portions 233, 234 secured to the proximal surfaces of the vertical legs of the inverted U-shaped frame members 230, 231. It will be noted in Figure 16 that the plate 232 and its portions 233, 234 extend outwardly substantially beyond opposite sides of the respective inverted U-shaped frame members 230, 231 to thereby prevent any bricks in the upper portions of the hack or stack from being dislodged during movement of the hack or stack A from one place to another. Horizontal shafts 236, 237 are journaled in the lower portions of the vertical legs of the inverted U-shaped frame members 230, 231 and opposite ends of the shaft 236 have the upper ends of gripper arms 240 fixed thereon and opposite ends of the shaft 237 have the upper ends of gripper arms 241 fixed thereon.

Figure 16:
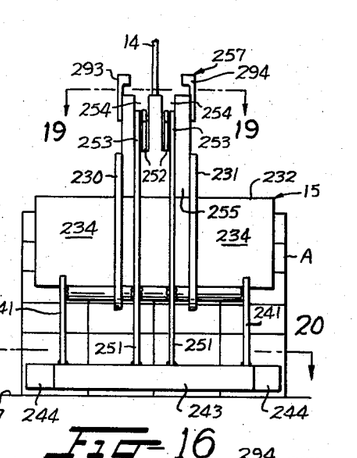
Figure 16 is a view looking at the right-hand side of Figure 15.
Figures 20, 21:
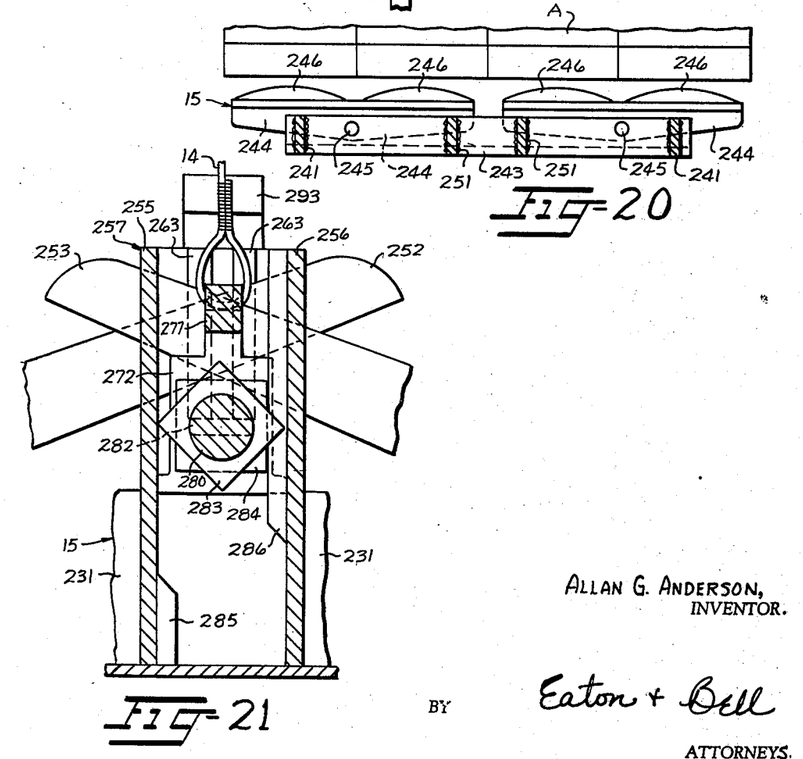
Figure 20 is an enlarged fragmentary plan view, partially in section, taken substantially along line 20—20 in Figure 16, and showing the compensating jaws at one side of the grappling device.
Figure 21 is a view similar to Figure 18, but showing the gripper operating or tong operating sear shaft in a different position from that shown in Figure 18.

It will be noted in Figure 16 that the arms 241 are spaced outwardly substantially relative to the distal surfaces of the frame members 230, 231. The gripper arms 240 are arranged in the same manner as the gripper arms 241 and support opposite ends of a gripping bar or jaw bar 242. The lower ends of the gripper arms 241 have opposite ends of a channel-shaped gripper bar 243 suitably secured thereto, and it will be observed in Figure 20 that there is, supported between the flanges of the channel-shaped gripper bar 243, a plurality of pivoted gripper jaws 244, of which two are shown in Figure 20.

Each of the pivoted gripper jaws or grappling jaws 244 is pivotally mounted, as at 245, between the upper and lower flanges of the channel-shaped jaw bar 243 and the inner vertical plate portion of each of the jaws 244 is provided with one or more resilient or rubber pads 246 suitably secured thereto. Each pad 246 preferably has convex inner or article engaging surface thereon. In this instance, there are two such resilient pads 246 shown on the inner face of each of the pivoted jaws 244 and it will be noted that there is one of the pads 246 provided for each horizontal row of bricks or other articles A to thereby insure that each individual row of bricks is tightly clamped against the jaw bar 242 when the jaw bar 242 and the pivoted jaws 244 are moved inwardly toward each other, as will be later described.

Suitably secured to the central portions of the jaw bars 242, 243 are the lower ends respective pairs of substantially L-shaped levers 250, 251, the medial portions of substantially vertical legs of which are fixed to the respective shafts 236, 237 at points between the frame members 230, 231. It will be observed in Figures 15, 16 and 18 that the levers 250, 251 are provided with inwardly and upwardly inclined arms 252, 253, respectively, whose proximal portions overlap each other as they extend through corresponding slots 254 formed in opposite side walls 255, 256 of a box-like housing which forms a part of a gripper activating and deactivating unit broadly designated at 257. Said box-like structure also includes spaced end walls 260, 261 and it will be observed in Figures 17 and 18 that the lower edges of said walls 255, 256, 260, 261 rest upon the plate 232 and the end walls 260, 261 are suitably secured to the proximal surfaces of the horizontal portions of the inverted U-shaped frame members 230, 231. The proximal surface of the end walls 260, 261 of said box-like structure have respective pairs of spaced projections 263, 264 thereon defining respective grooves therebetween and it will be observed in Figures 17 and 18 that the lower edges of these projections 263, 264 are spaced substantially above the plate 232.

Guided for vertical movement between the proximal surfaces of the projections 263, 264 is a W-shaped sear block broadly designated at 270 and which includes spaced upright portions 271 to 274, inclusive, the upright portions 271, 274 being connected at their lower ends to the lower ends of the intermediate upright portions 272, 273 by respective horizontal portions 275, 276 and the upper ends of the intermediate upright portions 272, 273 being bridged by a horizontal portion 277.

The term "sear" is used herein since the various parts so identified are instrumental in automatically cocking and uncocking the gripper elements generally in the manner of a pistol or gun.

It will be noted that the lower end of the cable 14 is suitably connected to the portion 277 of the sear block 270. Journaled in the upright portions 271 to 274, inclusive, of the sear block 270 is a sear shaft 280 whose opposite ends terminate substantially flush with the distal surfaces of the upright portions 271, 274 of the sear block 270 and, extending outwardly from the sear shaft 280 beyond the upright portions 271, 274 are ground flattened portions forming sear keys 281, 282 which are, at times, adapted to engage the lower surfaces of the projections 263, 264 on the walls 260, 261 of said box-like structure. At other times, the shaft 280 is rotated, by means to be later described, to where the sear keys 281, 282 are alined with and thus may pass into the slots or grooves defined between the adjacent pairs of projections 263, 264.

Fixed on the shaft 280 between the closely spaced intermediate portions 272, 273 of the sear block 270 is a pair of substantially rectangular or square sear cams 283, 284. It will be observed in Figures 18 and 21 that the corners of the sear cam 283 are disposed in alinement with the flat surfaces of the sear cam 284 and vice versa. It will also be noted that the distance across the corners of the sear cams 283, 284 is only slightly less than the distance between the side walls 255, 256.

The proximal surfaces of the side walls 255, 256 are provided with projections or ribs thereon which extend inwardly and whose inner surfaces are spaced from the vertical axis of the box-like structure defined by the walls 255, 256, 260, 261 a distance slightly greater than the distance between opposite flat edges of each of the rectangular or square cams 283, 284. The projections 285, 286 serve as sear shaft rotating elements and are disposed in off-set relationship and in the vertical planes of the respective sear cams 283, 284. It will be observed in Figures 18 and 21 that the projection 285 extends upwardly from adjacent the lower edge of the side wall 255 and terminates in an inwardly and downwardly inclined cam surface which is spaced substantially below the horizontal plane of the lower surface of the projection 286. The lower surface of the projection 286 is also beveled to form a cam surface thereon which extends inwardly and upwardly at an angle. The proximal or upper and lower edges of the respective sear shaft rotating elements or projections 285, 286 are necessarily spaced vertically apart sufficiently so that the upper right-hand corner of cam 284, in each instance, will clear the lower edge of the projection 286 as the upper edge of the projection 285 is engaged by the then inclined lower left-hand surface of the corresponding point of the square cam 283 in the course of downward movement of the sear block 270 relative to the projections 285, 286 from, say, the position shown in Figure 21 to substantially that shown in Figure 18.

It is apparent that in the course of such downward movement, one corner of the cam 283 engages the beveled or inclined upper end of the projection 285 to thus impart one-eighth revolution to the cams 283, 284, shaft 280 and its key portions 281, 282. On the other hand, the upper surface of projection 285 should also be spaced sufficiently below the lower surface of projection 286 so that, in the course of upward movement of the sear block 270, as imparted thereto by the lifting action of the cable 14, the then left-hand corner of the cam 283 will clear the upper end of the projection 285 as the then right-hand corner of the cam 284 engages the lower surface of the projection 286 to impart another one-eighth revolution to the cams 283, 284, the shaft 280 and the key portions 281, 282.

Figures 17, 18:
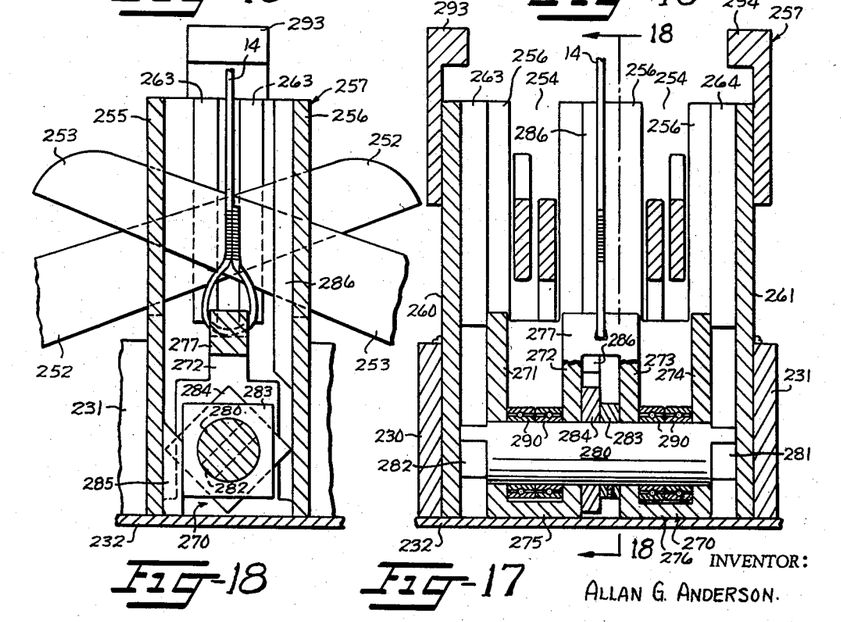
Figure 17 is an enlarged fragmentary vertical sectional view taken substantially along line 17—17 in Figure 15.
Figure 18 is an enlarged fragmentary vertical sectional view taken substantially along line 18—18 in Figure 17.
Figure 19:
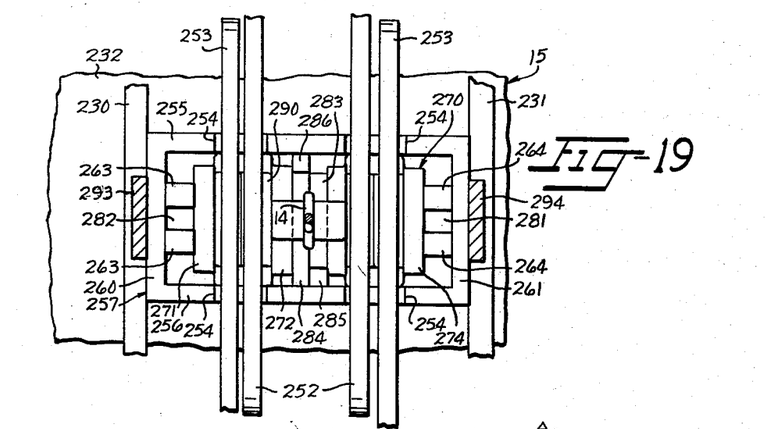
Figure 19 is an enlarged fragmentary plan view, partially in section, taken substantially along line 19—19 in Figure 16.

It is thus seen that, when the weight of the grappling device 15 is supported by means other than the cable 14, such as by a stack of articles A or by the lower surfaces of the bars 242, 243 engaging the surface 57, the sear block 270 and parts supported thereby will occupy substantially the position shown in Figures 17 and 18. However, upon upward movement of the cable 14, as effected by the crane assembly 10, the sear block 270 moves upwardly relative to the walls 255, 256, 260, 261, in the course of which the right-hand corner of the cam 284 in Figure 18 engages the lower cam surface on the projection 286 to thereby effect one-eighth revolution of movement to the cams 283, 284, the shaft 280 and the sear keys 281, 282.

It is apparent that this will cause the flat surfaces of the sear keys 281, 282 to extend in substantially horizontal planes so that, with further upward movement of the sear keys 281, 282, their upper surfaces will engage the lower surfaces of the projections 263, 264, as shown in Figure 21, to thereby raise the grappling device 15 without exerting upward pressure on the proximal portions of the arms 252, 253 of the respective levers 250, 251. Since the arms 252, 253 overlie the stack of articles A, it is apparent that they substantially overbalance the vertical portions of the levers 250, 251 and the parts attached thereto so that, as the sear keys 281, 282 engage the lower ends of the projections 263, 264 and raise the frame members 230, 231, they also raise the lever 250, 251 and the jaw bar 242 and the pads 246 on the jaws 244 (Figure 20) remain clear of the stack of articles A in the course of upward movement thereof.

Now, upon the next succeeding and alternate downward movement of the cable 14, and upon the weight of the grappling device 15 being supported either by a stack of articles such as the articles A or the surface upon which the stack of articles is resting, the sear block 270 and associated parts move downwardly relative to the box-like structure including plates or wall members 255, 256, 261 and, in the course of such downward movement, one of the then horizontally extending pointed portions of the cam 283 engages the upper end of and is rotated by the projection 285 (Figures 18 and 21) to again impart one-eighth revolution to the cams 283, 284, the shaft 280 and the sear keys 281, 282.

Thus, one the next upward movement of the sear block 270, as effected by the cable 14, the right-hand pointed portion of the cam 284 again engages the lower end of the projection 286 to impart another one-eighth revolution thereto so the cams 283, 284, shaft 280 and sear keys 281, 282 will occupy a position revolved ninety degrees from that shown in Figure 21. It is thus seen that, with further upward movement of the sear block 270, the sear keys 281, 282 then pass upwardly between the corresponding pairs of projections 263, 264.

Referring to Figure 17, it will be observed that the shaft 280 has anti-friction bearings or follower members 290 thereon disposed between the portions 271, 272 and 273, 274. In this instance, there are two bearings 290 disposed between the portions 271, 272 and there are two bearings disposed between the portions 273, 274. Thus, as the sear keys 281, 282 move upwardly between the respective pairs of projections 263, 264, the bearings 290 engage the lower surfaces of the overlapping portions of the corresponding pairs of arms 252, 253 to thereby impart upward movement to the proximal portions thereof which will, in turn, cause the jaw bar 242 to move inwardly in engagement with one end of the lowermost tier or articles A and this will also cause the resilient members 246 on the jaws 244 carried by the jaw bar 243 to move inwardly in engagement with each row of articles in the bottom tier of articles A.

Thus, the bottom tier of articles A is tightly clamped between the pads 246 on the jaws 244 and the jaw bar 242 so that, with further upward movement of the cable 14 and the sear block 270, upward movement is then imparted to all of the parts of the grappling device 15 along with the stack of articles A.

The stack of articles A is then lifted by pressure exerted on the bottom tier of articles through the arms 150, 151. In the absence of an article or articles between the jaw bars 242, 243, when the sear keys 281, 282 move upwardly between projections 263, 264, the upper ends of portions 271, 274 of sear block 270 engage respective stops 293, 294 fixed to the side walls 260, 261. The remaining parts of the grappling device 15 then move upwardly with the sear block 270.

The operator may then depress the desired switches in the switch unit S to impart movement to the carriages 11 and 12 in the desired directions and sequence and to also impart movement to the crane assembly 10 in either direction about its vertical axis and to also raise and lower the boom levers 152, 152', as desired.

It is apparent that, when the cable 14 is again lowered and becomes slackened, the jaw bars 242, 243 then move apart from each other to release the stack of articles therefrom and will remain in this position as the grappling device 15 is subsequently raised and until the grappling device 15 is again lowered and upward movement is again initially imparted thereto in the manner heretofore described.

It is thus seen that I have provided a novel wheeled conveyance especially constructed for supporting the improved apparatus and wherein the apparatus includes a primary or main carriage which can be moved longitudinally of the conveyance and which has a secondary carriage thereon which can be moved laterally upon the main carriage.

Also, it is to be noted that I have provided a crane construction which is movable about a vertical axis upon the secondary or upper carriage and which includes a boom which can be raised and lowered and which boom has an improved grappling device connected to the cable thereof. It is also seen that I have provided an improved grappling device which will automatically grasp articles with alternate upward movements thereof and which will automatically release the articles therefrom upon being lowered.

It should be noted that I have also provided improved pivoted side gates or panels on the conveyance which can be suspended in lowered or inoperative position during the loading and unloading of the conveyance and which can then be moved upwardly to operative position and locked in such position as the articles are conveyed from one place to another. Referring to Figure 1, it will be noted that the front edge of the foremost gate 34 is disposed rearwardly of the main carriage 12 when said main carriage is in its foremost position on the conveyance 13. Thus, the main carriage 12 does not interfere with the position of the gates 34 while in upright operative position as shown in Figure 3.

In the drawing and specification there has been set forth a preferred embodiment of the invention and, although specific terms are employed, they are used in a generic and descriptive sense only, and not for purposes of limitation, the scope of the invention being defined in the claims.

I claim:

1. Apparatus for universally mounting a crane having a base upon an elongated truck bed comprising a main wheeled carriage extending across and above the truck bed and guided for longitudinal movement on the truck bed, an elongated sprocket chain mounted adjacent and secured to each side edge of and extending substantially throughout the length of the truck bed, a sprocket wheel rotatably supported on each side of said main carriage and engaging the corresponding elongated sprocket chains, manually controlled driving means for imparting rotation to said sprocket wheels for effecting movement to said main carriage longitudinally of the truck bed, an auxiliary carriage supported by and mounted for lateral movement on said main carriage relative to the longitudinal axis of the truck bed, at least one threaded shaft journaled in said main carriage and extending laterally of the truck bed, internally threaded means carried by said auxiliary carriage and penetrated by said threaded shaft, manually controlled driving means for imparting rotation to said threaded shaft in either direction for imparting corresponding movement to the auxiliary carriage laterally of the truck bed, means supporting the base of said crane for rotation about a subsatntially vertical axis upon the auxiliary carriage, manually controlled driving means for imparting rotation to the crane in either direction about its vertical axis, each of said driving means comprising a fluid pressure operated reversible motor, a four-way electrically operable valve for each of said fluid pressure operated motors, means on said main carriage for supporting all of said four-way valves, a pair of inlet and outlet flexible conduits extending from a source of fluid pressure and outwardly from adjacent the central portion of the truck bed, the inlet and outlet conduits extending longitudinally of the truck bed adjacent the opposite sides thereof and to the main carriage, means connecting the inlet conduit to corresponding sides of all of said valves, means connecting the outlet conduit to other corresponding sides of all of said valves, a pair of conduits extending from opposite sides of each motor to its corresponding valve, means operatively connected with each of said valves for selectively directing fluid pressure from the inlet conduit to either of the conduits extending from each fluid pressure operated motor while directing fluid from the other side of the corresponding motor through the corresponding valve and through the outlet conduit, and said last-named means being so arranged as to prevent the flow of fluid pressure through the corresponding motor when the corresponding valve is inoperative.

2. Apparatus for universally mounting a crane having a base upon an elongated truck bed comprising a main wheeled carriage extending across and above the truck bed and guided for longitudinal movement on the truck bed, an elongated sprocket chain mounted adjacent and secured to each side edge of and extending substantially throughout the length of the truck bed, a sprocket wheel rotatably supported on each side of said main carriage and engaging the corresponding elongated sprocket chains, manually controlled driving means for imparting rotation to said sprocket wheels for effecting movement to said main carriage longitudinally of the truck bed, an auxiliary carriage supported by and mounted for lateral movement on said main carriage relative to the longitudinal axis of the truck bed, at least one threaded shaft journaled in said main carriage and extending laterally of the truck bed, internally threaded means carried by said auxiliary carriage and penetrated by said threaded shaft, manually controlled driving means for imparting rotation to said threaded shaft in either direction for imparting corresponding movement to the auxiliary carriage laterally of the truck bed, means supporting the base of said crane for rotation about a substantially vertical axis upon the auxiliary carriage, manually controlled driving means for imparting rotation to the crane in either direction about its vertical axis, each of said driving means comprising a fluid pressure operated reversible motor, a four-way electrically operable valve for each of said fluid pressure operated motors, means on said main carriage for supporting all of said four-way valves, a pair of inlet and outlet flexible conduits extending from a source of fluid pressure and outwardly from adjacent the central portion of the truck bed, the inlet and outlet conduits extending longitudinally of the truck bed adjacent the opposite sides thereof and to the main carriage, means connecting the inlet conduit to corresponding sides of all of said valves, a pair of conduits extending from opposite sides of each motor to its corresponding valve, electrically operable remotely controlled means operatively connected with each of said valves for selectively directing fluid pressure from the inlet conduit to either of the conduits extending from each fluid pressure operated motor while directing fluid from the other side of the corresponding motor through the corresponding valve and through the outlet conduit, and each of said valves being so arranged as to prevent the flow of fluid pressure through the corresponding motor when the corresponding valve is de-energized.

References Cited in the file of this patent

UNITED STATES PATENTS

| | | |
|---|---|---|
| 717,994 | Holland | Jan. 6, 1903 |
| 890,151 | Marshall | June 9, 1908 |
| 894,452 | Medairy | July 28, 1908 |
| 1,052,096 | Schulze | Feb. 4, 1913 |
| 1,918,419 | Needham | July 18, 1933 |
| 2,177,525 | Henderson | Oct. 24, 1939 |
| 2,392,004 | Sherman | Jan. 1, 1946 |
| 2,456,104 | Andersen | Dec. 14, 1948 |
| 2,528,588 | Forslund | Nov. 7, 1950 |
| 2,558,306 | McIntyre | June 26, 1951 |
| 2,599,677 | Waguespack | June 10, 1952 |
| 2,609,951 | Daniels | Sept. 9, 1952 |
| 2,629,627 | Stone | Feb. 24, 1953 |
| 2,656,212 | Eckstein | Oct. 20, 1953 |
| 2,697,381 | Maillard | Dec. 21, 1954 |